United States Patent
Bank et al.

(10) Patent No.: US 10,073,886 B2
(45) Date of Patent: Sep. 11, 2018

(54) SEARCH RESULTS BASED ON A SEARCH HISTORY

(71) Applicant: International Business Machines Corporation, Armonk, NY (US)

(72) Inventors: Judith H. Bank, Cary, NC (US); Lisa M. Bradley, Cary, NC (US); Aaron J. Quirk, Cary, NC (US); Lin Sun, Morrisville, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 134 days.

(21) Appl. No.: 14/722,209

(22) Filed: May 27, 2015

(65) Prior Publication Data

US 2016/0350379 A1    Dec. 1, 2016

(51) Int. Cl.
G06F 17/30    (2006.01)

(52) U.S. Cl.
CPC .. G06F 17/30477 (2013.01); G06F 17/30598 (2013.01); G06F 17/30867 (2013.01)

(58) Field of Classification Search
CPC ............... G06F 17/30457; G06F 17/30867
See application file for complete search history.

(56) References Cited

U.S. PATENT DOCUMENTS

| | | | |
|---|---|---|---|
| 8,001,105 B2 | 8/2011 | Bolivar et al. | |
| 8,370,329 B2 | 2/2013 | Gutt et al. | |
| 8,606,739 B2 * | 12/2013 | Apacible | G06F 17/30675 706/50 |
| 2009/0282021 A1 * | 11/2009 | Bennett | G06F 17/30648 |
| 2010/0169340 A1 * | 7/2010 | Kenedy | G06Q 30/0631 707/758 |
| 2010/0257171 A1 * | 10/2010 | Shekhawat | G06F 17/30707 707/738 |
| 2012/0005219 A1 * | 1/2012 | Apacible | G06F 17/30675 707/768 |
| 2012/0047135 A1 | 2/2012 | Hansson et al. | |
| 2012/0254151 A1 | 10/2012 | Reitter et al. | |
| 2012/0290950 A1 | 11/2012 | Rapaport et al. | |
| 2013/0173614 A1 | 7/2013 | Ismalon | |
| 2016/0350370 A1 | 12/2016 | Bank et al. | |

OTHER PUBLICATIONS

List of IBM Patents or Patent Applictions Treated as Related; (Appendix P), Filed Dec. 15, 2016, 2 pages.

* cited by examiner

*Primary Examiner* — Loc Tran
(74) *Attorney, Agent, or Firm* — Cantor Colburn LLP; Nicholas Bowman (57) ABSTRACT

Aspects relate to improving search results based on a search history. Searches performed by a user are monitored to collect search data. The search data is categorized according to search terms, search sites, and result satisfactions to form the search history. A search request that includes one or more search terms related to at least one of the search terms in the search history is received. A predicted satisfaction level of the user with results of the received search request is estimated based on contents of the received search request and the search history. The search request is modified to increase the predicted satisfaction level of the user with results of the received search request. The modifying is based on contents of the received search request and the search history. A search is performed based on the modified search request.

20 Claims, 4 Drawing Sheets

| SEARCH TIME 302 | SEARCH TERM 304 | SEARCH SITE 306 | SATISFACTORY RESULT(S) 308 | UNSATISFACTORY RESULT(S) 310 | WITH HELP? 312 |
|---|---|---|---|---|---|
| 9/2/2013 4PM-4:02PM | EXPORT A PATTERN, EXPORT PATTERN, EXPORT VIRTUAL APPLICATION PATTERN | PURE APPLICATION SYSTEM INFORMATION CENTER URL | [URL6, URL7] | [URL1, URL2, URL3] | NO |
| 9/3/2013 2PM-2:10PM | REMOVE A PLUGIN, REMOVE PLUGIN, PLUGIN MANAGEMENT | PURE APPLICATION SYSTEM INFORMATION CENTER URL | URL10 | [URL11, URL12, URL13, URL14, URL15, URL16, URL17, URL18, URL19, URL20] | YES, RECEIVED AN IM CONTAINING THE URL |
| 9/3/2013 3PM-3:06PM | INSTALL A PLUGIN, INSTALL PLUGIN, PLUGIN DEVELOPMENT | PURE APPLICATION SYSTEM INFORMATION CENTER URL | URL20 | [URL21, URL22, URL23, URL24, URL25, URL26, URL27, URL28, URL29] | NO |
| 9/4/2013 2PM-2:02PM | V7000 MIGRATION | PURE APPLICATION SYSTEM INFORMATION CENTER URL | URL31 | N/A | NO |
| 9/4/2013 3PM-3:02PM | DEDICATED CLOUD GROUP | PURE APPLICATION SYSTEM INFORMATION CENTER URL | URL41 | [URL42, URL43] | NO |

SEARCH RESULTS BASED ON A SEARCH HISTORY

BACKGROUND

The present disclosure relates generally to computers and, more specifically, to improving search results based on a search history.

SUMMARY

According to embodiments, a method, system, and computer program product is provided for improving search results based on a search history. Searches performed by a user are monitored to collect search data. The search data is categorized according to search terms, search sites, and result satisfactions to form the search history. A search request that includes one or more search terms related to at least one of the search terms in the search history is received. A predicted satisfaction level of the user with results of the received search request is estimated based on contents of the received search request and the search history. The search request is modified to increase the predicted satisfaction level of the user with results of the received search request. The modifying is based on contents of the received search request and the search history. A search is performed based on the modified search request.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

There are currently more than two billion Internet users in the world. Web browsing and searching has become one of the most important ways for people to gain information. Embodiments described herein provide a tool to leverage users' history of previous search results, including search failures and struggles, to guide users in choosing the right keywords that can produce the desired search results. Recommended search terms can be generated from a user's previous searches as well from the previous searches of users in the user's social network(s). In addition to providing a user with recommended search terms, embodiments can also automatically correct search requests (e.g., by changing the search terms) and return search results to the user based on a history of previous user satisfaction with search results after similar search failures and attempts. Embodiments can also order the search results that are returned to the user based on the search history.

Many users of computer systems rely on search engines to perform searches to help in locating desired information. Having accurate searches, including the right search terms, can help the users improve their productivity tremendously throughout the day. For example, a user may often search product information center websites from a particular company to find the detailed technical information that she needs to perform her job. Sometimes, without effective search terms or relevant search results, the user can spend ten or more minutes searching while still not being able to locate the information that she needs. Often, she then needs to contact one or more of her co-workers for assistance. This adds more time spent on searching to locate the desired technical information. This is not very cost effective and can be frustrating.

Embodiments described herein can be used to leverage past user search attempts using a search history in order to suggest better search terms for use in future searches. As used herein, the term "better search term" refers to a search term that has a higher likelihood (than another search term) of returning search results that are useful to the user. By modifying a search request with one or more better search terms, a predicted satisfaction level of the user with the results can be increased. The search request can be modified by adding a search term, removing a search term and/or changing a search term in order to increase the likelihood that the user will obtain the desired search results. The search request can also be modified to return search results in a particular order based on contents of the search history so that search results that are likely to contain the information that the user is looking for are at the top of the list of search results.

Embodiments described can also be used to leverage a search history of search attempts made by a social network group (e.g., of the user) to better predict better search terms in the future searches. Thus, search histories of several users at different locations can be collected and analyzed via the cloud (or other network), and then used to improve search results for the user.

Figure 1:
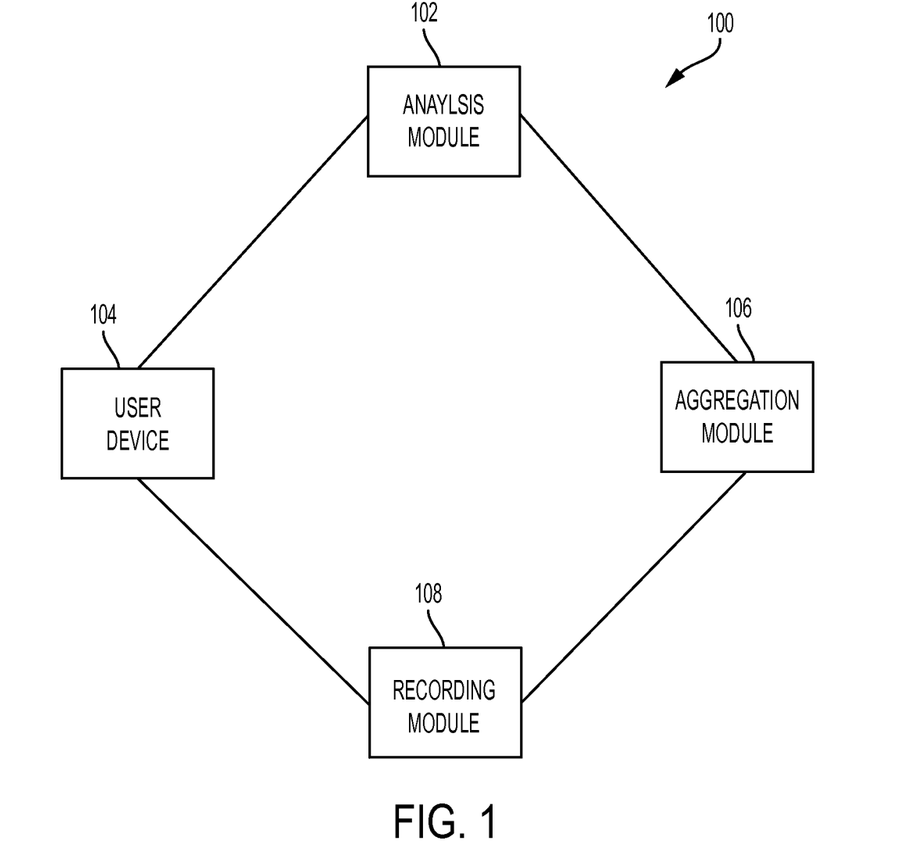
FIG. 1 depicts a high level process flow of modules for improving search results based on a search history in accordance with an embodiment.

Turning now to FIG. 1, a high level process flow 100 of modules for improving search results based on a search history is generally shown in accordance with an embodiment. As shown in FIG. 1, a recording module 108 can monitor searches performed by a user at a user device 104. The recording module can record the user's search behavior for search requests and search sites visited in storage on a local computer (e.g., the user device 104). The user's search behavior can include information such as, but not limited to: search terms; a site that the user used to perform the search; a time when the search was initiated; and an end time when the search was completed. In addition, the recording module 108 can record uniform resource locators (URLs) associated with successful (satisfactory) results and URLs associated with unsuccessful (unsatisfactory) results.

In embodiments, the system can automatically detect that the results of a search are successful (e.g., when the user exits the website after spending a threshold amount of time viewing the results, or page). In other embodiments, the system can provide a button to allow users to confirm that the current page(s) (e.g., URLs) is what the user was looking for. The original search terms can be shown to the user in order to allow a correlation between search terms and a successful result. In future searches, the system can automatically substitute search terms that had resulted in a successful search for the same information in the past (i.e., when the original search terms entered by the user had failed). The user can set preferences such that search term substitution(s) in search requests are displayed or they can remain hidden. The user can also provide a specific list of contacts or social network groups to monitor for similar searches, or the system can include all contacts on the user contact list(s) and in his social network group(s).

An aggregation module 106 can collect all of the struggle search behaviors from various users into a centralized system, for example, in the cloud. As used herein, the term "struggle search behaviors" refers to searches (and associated search terms) attempted by a user before finding a page having the desired information. Alternatively, the aggregation module 106 can collect struggle search behaviors for users within a particular social network (e.g., work for the same company or division of the company, attended the same university, have expressed an interest in the same subject, etc.) and/or users accessing a particular website or group of websites.

Figure 3:
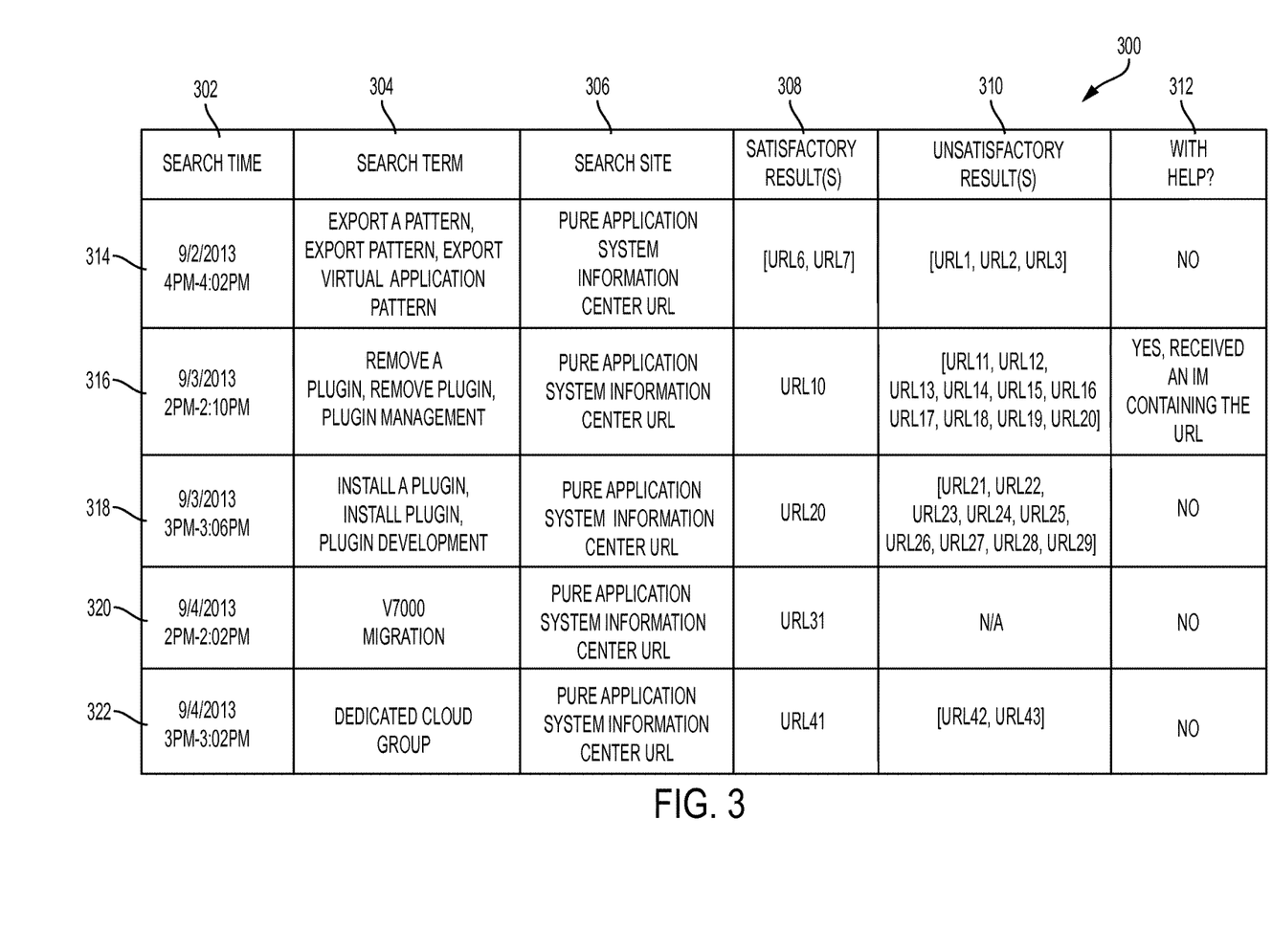
FIG. 3 depicts an example of data recorded by a recording module in accordance with an embodiment.

An analysis module 102 can analyze the data collected by the aggregation module 106 to either suggest alternative search terms to a user (e.g., via the user device 104) or to link the current search terms in a search request to modified search terms that are more likely to produce the desired return results of the user. An example of an embodiment of data collected from recording module 108 based on a user's own search behavior history is shown in FIG. 3 and discussed below.

Figure 2:
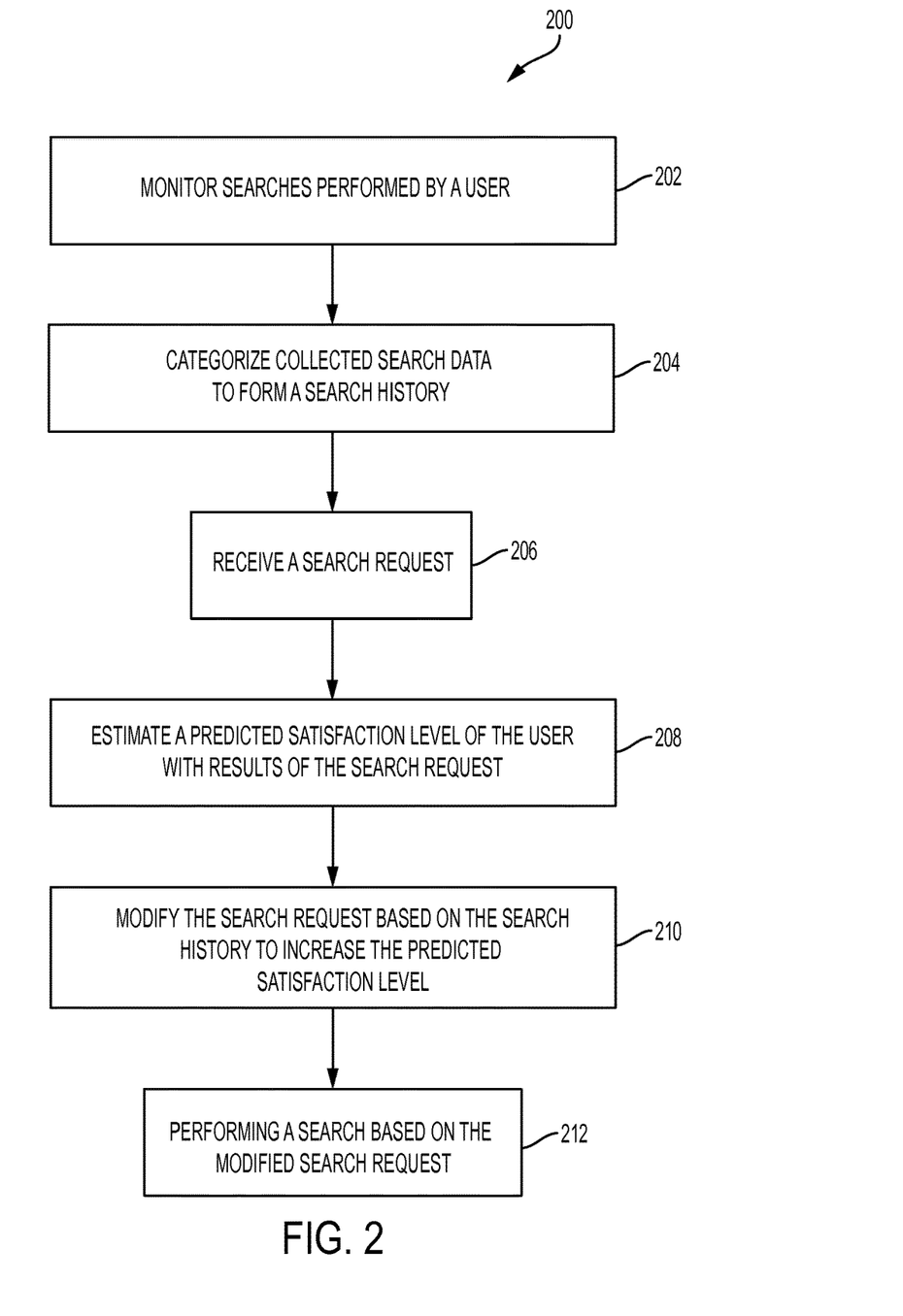
FIG. 2 depicts a process flow for improving search results based on a search history in accordance with an embodiment.

Turning now to FIG. 2, a process flow 200 for improving search results based on a search history is generally shown in accordance with an embodiment. An embodiment can be implemented by an application executing on a computer processor such as that shown in FIG. 4. Referring now to FIG. 2, searches performed by a user are monitored to collect search data at block 202. The monitoring can be implemented by the recording module 108 shown in FIG. 1. In an embodiment, the search data collected can include, but is not limited to: search time, search term(s), search site(s), result(s) returned, and any help received. The monitoring can be performed using generally available tools such as, but not limited to, a web site plugin that can monitor users' behavior on the computer such as what the user has typed, what the site has returned, and the user's follow on activities on the resulting page. Any known monitoring software can be used by embodiments to monitor a user's behavior (action/clicks/types) on a given site(s). An example of a tool that can be utilized is BrowserReporter from Current Ware which can be used to capture URLs visited, bandwidth, and time spent at each website. Another tool that can be utilized is ClientRecorder from Spector Soft which can be used to capture search keywords, website visits, file transfers, etc. on any computer in a network. An additional example of a tool that can be utilized is the XKeystore tool from the National Security Agency that can collect data on any action that the user takes on a computer.

At block 204, the results of the search data collected about the monitored searches are categorized for example, according to search terms, search sites, and result satisfactions to form a search history that can be used to improve search results for future searches. In an embodiment, the categorizing is performed by the analysis module 102 of FIG. 1 and the output of the categorizing is a search history. Categorizing can be performed in any manner known in the art, for example by having the system automatically tag different items and categorize the items based on the tags. Another technique for categorizing can include automatically generating keywords related to each item and then using the keywords to categorize the items. The categorizing can include identifying search term failures and replacement search term successes. Examples of things that can be identified as search term failures include but are not limited to: a message from the browser that says "your search did not match any documents"; a message from the browser that says "showing results for XXX instead of YYY"; the user scrolled down a list of websites but did not visit any; and the user visited websites but spent less than 10 seconds on each.

Input to the categorizing can include receiving an input from the user, via a user interface (e.g., a selection button or other indicator) on the user device 104 that specifies a satisfaction level of the user with the results returned from a search. In embodiments, a manual prompt can be presented to the user asking the user for an estimated satisfaction level. In embodiments, the satisfaction level of the user can be inferred, or automatically derived, based on actions taken by the user such as, but not limited: the facial expression of the user; the user spends a long time (e.g., as measured by a threshold time) on the website; the user fills out forms or copies and pastes content; the user visits links from the website; the user mentions the URL in emails or social networking input; the user selects other sites to visit from the original search (i.e., does not immediately do a new search); the user bookmarks the website; the user sorts bookmarks to position websites at the top of the list; and/or the user marks the website as preferred. In embodiments, the satisfaction score increases with the number of these actions that are observed.

The satisfaction level of a user can be measured on a continuous scale (e.g., level is between 0 and 1, with 1 being highest satisfaction and 0 being not satisfied at all) or it can be measured on a discrete scale (e.g., two discrete levels indicating satisfied and not satisfied; or four discrete levels indicating not satisfied, mildly satisfied, satisfied, and very satisfied).

As shown in FIG. 2, at block 206 a new search request is received from the user (e.g., via the user device 104). The analysis module 102 can be utilized to determine whether the new search request includes search terms that are the same and/or related to at least one of the search terms in the search history. In an embodiment, search terms are related if they produce many of the same results (e.g., URLs). Search terms can also be related if they pertain to the same general category (e.g., the category mammals with thumbs may correspond to search terms monkeys, humans, and raccoons).

Processing continues at block 208, where a predicted satisfaction level of the user with results of the search request that was received at block 206 is estimated, for example, by the analysis module 102. The predicted satisfaction level can be estimated by calculating the weighted sum of observed actions by the user, where mentioning the URL might have a weight of 5 and visiting links might have a weight of 2. Any combination of actions and weighting can be implemented by embodiments, as implementations may vary. The predicted satisfaction can also be estimated by counting the number of observed actions by the user.

At block 210, the search request is modified (e.g., by the analysis module 102 or by the user) based on the search history in order to increase the estimated predicted satisfaction level of the user with results of the search request. Deciding how to modify the received search request can be performed by using facial expressions of the user to find out if the user is struggling with the search. Another way to decide how to modify the received search request is by using the past records of a user to determine that the user has searched the same keywords in the past and after some struggle, landed on a URL resulting in a satisfaction level of at least a threshold value (e.g., satisfied or 0.75 on a scale of 0 to 1). Modifications to the search request can include changing a search term(s) and/or changing an order of results of the search request.

In an embodiment, the received search request is modified automatically without user input. In another embodiment, the search request modifications are suggested to the user (e.g., by the analysis module 102) and the user can modify the search request (e.g., via the user device 104) based on the suggestions. In other embodiments, the decision of whether to use an automatic or manual user modification can be made separately for each search request based, for example, on the predicated satisfaction level of the user with the received search request, the predicted satisfaction level of the user with the modified search request, and/or the difference between the two. The decision can also be made based on a probability associated with one or both of the predicted satisfaction levels. In addition, the decision of whether to make automatic or manual modifications can be based on whether the history data includes data related to just the user or to a particular set of users (e.g., a social network group). Further, the decision can be made based on the search site and/or search terms.

Block 212 of FIG. 2 is performed to execute the modified search request and to return the search results to the user.

In an embodiment, the search history is stored in a database. Search histories of a plurality of users can be accumulated in the database and utilized collectively as input to blocks 208 and 210. The plurality of users can belong to a social network of the user and/or to a work network.

An example of improving search results based on a search history in accordance with an embodiment follows.

FIG. 3 depicts an example of data recorded by the recording module 108 in accordance with an embodiment. The collected data 300 is shown in FIG. 3 in table format, with each row representing a series of one or more searches that were performed by a user to reach a desired search result. As shown in row 314 of FIG. 3, the search time column 302 indicates that a search was performed on Sep. 2, 2013 from 4 p.m. to 4:02 p.m.; the search term column 304 indicates that the search terms that the user used in the search request(s) included "export a pattern", "export pattern", and "export virtual application pattern"; the search site column 306 indicates that the website being searched by the user was a pure application system information center URL; the satisfactory result(s) column 308 indicates that URL6 and URL7 were returned by the searches and contained the information that the user was looking for; the unsatisfactory result(s) column 310 indicates that URL1, URL2, and URL3 were returned by the searches and did not contain the information that the user was looking for; and the with help column 312 indicates that the satisfactory results were located by the user without any assistance.

In an embodiment, the recording module 108 determines that particular URLs contain satisfactory results and that other URLs contain unsatisfactory results. In an embodiment, the analysis module 102 can analyze the data in FIG. 3 to determine that row 314, row 320, and row 322 are not relevant as the user quickly found what they needed in a short period of time. The analysis module 102 can also determine that row 316 and row 318 both take a relatively long period of time, ten minutes and six minutes respectively, to find a simple technical reference and thus these rows should be flagged as search result aids for the user. Search result aids can be shown as search results that are prioritized high in the list of URLs returned to the user so that the user can discover them quickly when performing a search with similar search terms in the future.

The user device 104 can be used to leverage the user's current search terms, sending the search terms to the analysis module 102 to analyze and display the improved search experience to the user based on the current user or the user's social network contacts search struggle in the past to discover matching search results.

For example, after a month of the user searching on the search term "remove plugin" in the pure application system information center website, instead of the default return by the search engine, the server consults the analysis module 102 to determine the satisfactory results returned to the user and/or the user's social network contact in the past, and thus recommends URL10 to be returned to the top of the search result list.

Alternatively, or in addition to modifying the order of the search result list, the search term "remove plugin" can be automatically replaced by one or more static terms that are associated with the page at URL10. Instead of automatically replacing the search term in the search request, the analysis module 102 can suggest that the user modify the search request to include one or more of the static terms that are associated the page at URL10. Thus, the search request can be modified by changing the order of the search results and/or by changing the search terms.

In some embodiments, one or more methods are embodied in a set of instructions for one or more processors having access to one or more types of memory. The instructions can be coded in hardware or in software. Many kinds of platforms may be used, including but not limited to: computers, mobile telephones, tablet devices, game consoles, network management devices, field-programmable gate arrays, and cloud-based computer systems. Aspects of the disclosure can be deployed on multiple devices for concurrent operation. Embodiments may be used as a component of a larger system such as a database management system.

Figure 4:
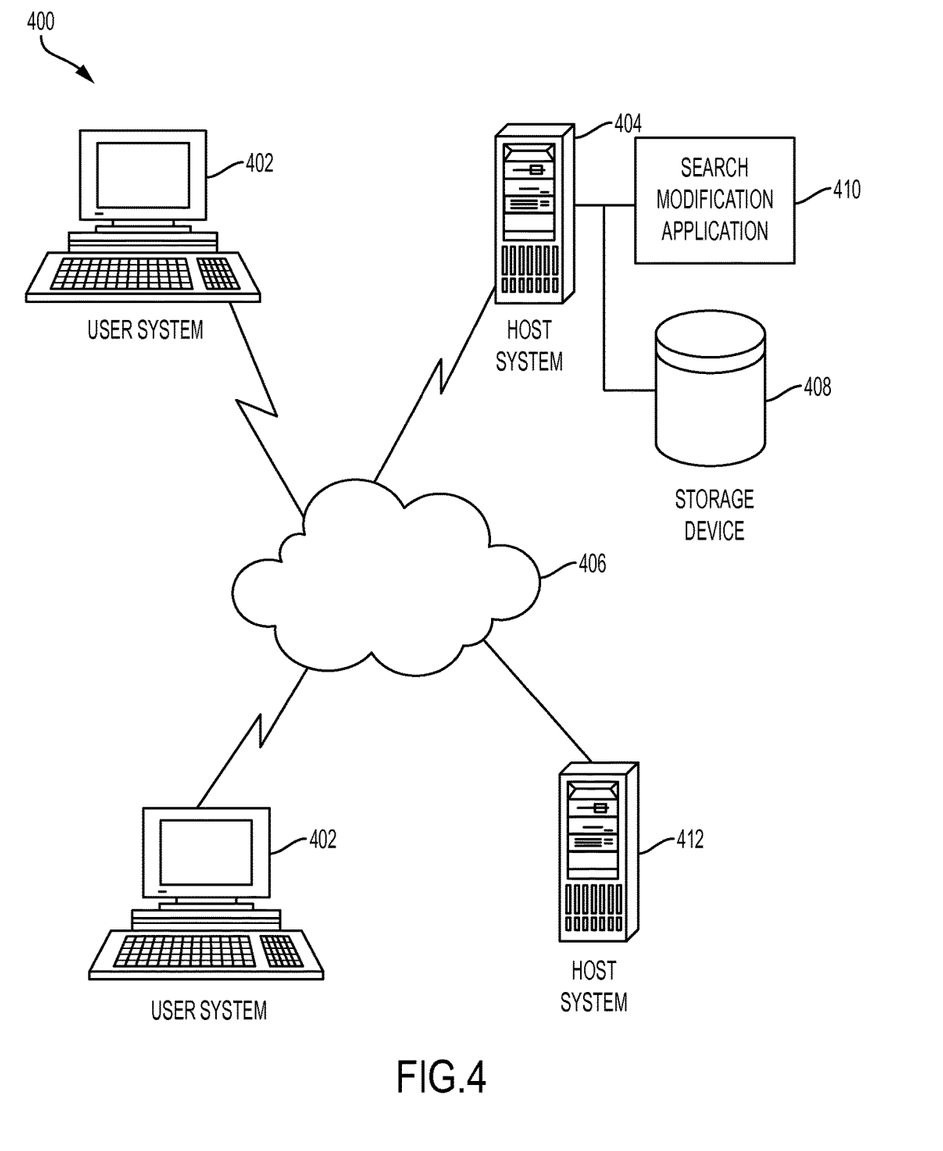
FIG. 4 depicts a block diagram of a system for improving search results based on a search history in accordance with an embodiment.

Referring to FIG. 4, a block diagram of an exemplary system 400 for improving search results based on a search history is generally shown in accordance with an embodiment. The system 400 includes a search modification application 410 for performing the processing described herein that is executed by one or more computer programs located on a host system 404 and/or a user system(s) 402.

The system 400 depicted in FIG. 4 includes one or more user systems 402 through which users at one or more geographic locations may contact the host system 404 to initiate programs. The user systems 402 are coupled to the host system 404 via a network 406. Each user system 402 may be implemented using a general-purpose computer executing a computer program for carrying out the processes described herein. The user systems 402 may be user devices such as personal computers (e.g., a lap top, a tablet computer, a cellular telephone) or host attached terminals. If the user systems 402 are personal computers, the processing described herein may be shared by a user system 402 and the host system 404. The user systems 402 may also include game consoles, network management devices, and field programmable gate arrays. In addition, multiple user systems 402 and/or host systems 404 may be concurrently operating to aggregate web interactions for personalized usage.

The network 406 may be any type of known network including, but not limited to, a wide area network (WAN), a local area network (LAN), a global network (e.g. Internet), a virtual private network (VPN), a cloud network, and an intranet. The network 406 may be implemented using a wireless network or any kind of physical network implementation known in the art. A user system 402 may be coupled to the host system through multiple networks (e.g., cellular and Internet) so that not all user systems 402 are coupled to the host system 404 through the same network. One or more of the user systems 402 and the host system 404 may be connected to the network 406 in a wireless fashion. In one embodiment, the network is the Internet and one or more user systems 402 execute a user interface application (e.g. a web browser) to contact the host system 404 through the network 406. In another exemplary embodiment, the user system 402 is connected directly (i.e., not through the network 406) to the host system 404. In a further embodiment, the host system 404 is connected directly to or contains the storage device 408.

The storage device 408 includes data relating to the search modification application 410 and may be implemented using a variety of devices for storing electronic information. In an embodiment, data stored in the storage device 408 includes, but is not limited to, one or more search data and search history databases, and other data utilized by embodiments described herein. It is understood that the storage device 408 may be implemented using memory contained in the host system 404 or that it may be a separate physical device. The storage device 408 may be logically addressable as a consolidated data source across a distributed environment that includes the network 406. Information stored in the storage device 408 may be retrieved and manipulated via the host system 404 and/or via a user system 402.

The host system 404 depicted in FIG. 4 may be implemented using one or more servers operating in response to a computer program stored in a storage medium accessible by the server. The host system 404 may operate as a network server (e.g., a web server) to communicate with the user system 402. The host system 404 handles sending and receiving information to and from the user system 402 and can perform associated tasks. The host system 404 may also include a firewall to prevent unauthorized access to the host system 404 and enforce any limitations on authorized access. For instance, an administrator may have access to the entire system and have authority to modify portions of the system. A firewall may be implemented using conventional hardware and/or software as is known in the art.

The host system 404 may also operate as an application server. The host system 404 executes one or more computer programs, including a search modification application 410, to provide aspects of embodiments as described herein. Processing may be shared by the user system 402 and the host system 404 by providing an application to the user system 402. Alternatively, the user system 402 can include a stand-alone software application for performing a portion or all of the processing described herein. As previously described, it is understood that separate servers may be utilized to implement the network server functions and the application server functions. Alternatively, the network server, the firewall, and the application server may be implemented by a single server executing computer programs to perform the requisite functions.

Technical effects and benefits include providing the ability for a user's search request(s) to be modified based on previous successful searches (of the user or of a group of users that the user is associated with) after failures, while allowing the user to continue using the same search keywords. This can lead to a reduction of a user's frustration when performing searches, improve a user's work productivity and satisfaction, and simplify the user search experience.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A method for improving search results based on a search history, the method comprising:

monitoring searches performed by a user, the monitoring including collecting search data, the search data including search terms, search sites, and search times, each search time including a search initiation time and a search completion time, wherein at least one of the searches returns a first web page and a second web page as search results, and the user views both the first web page and the second web page subsequent to a search initiation time of the search and prior to a search completion time of the search;

categorizing the search data according to the search terms, the search sites, the search times, and result satisfactions to form the search history;

receiving a search request that includes one or more search terms related to at least one of the search terms in the search history;

estimating a predicted satisfaction level of the user with results of the received search request, the estimating based on contents of the received search request and the search history;

modifying the search request to increase the predicted satisfaction level of the user with results of the received search request, the modifying based on contents of the received search request and the search history;

performing a search based on the modified search request; and outputting results of the search to the user, the results output in a priority order based at least in part on the search times and result satisfactions, wherein a first search result related to a first satisfactory search result in the search history having a first search time is output as a higher priority result than a second search result related to a second satisfactory search result in the search history having a second search time lower than the first search time, and wherein the first search result and the second search result are included in the results of the search.

2. The method of claim 1, wherein the modifying is performed automatically without input by the user.

3. The method of claim 1, wherein the modifying is performed based on user input.

4. The method of claim 1, wherein the categorizing the search data includes identifying search term failures and replacement search term successes, and the modifying includes substituting a replacement search term for a search term in the received search request.

5. The method of claim 1, wherein the method further comprises automatically performing the modifying based on a probability associated with the predicted satisfaction level of the user.

6. The method of claim 1, wherein the method further comprises automatically performing the modifying based on an incremental improvement associated with the predicted satisfaction level of the user.

7. The method of claim 1, further comprising:
providing a user interface to the user; and
receiving information about the result satisfactions from the user via the user interface.

8. The method of claim 1, further comprising:
storing the search history in a database;
accumulating search histories of other users in the database; and
utilizing the search histories of other users along with the search history of the user as input to the estimating and the modifying.

9. The method of claim 8, wherein the other users are in a social network of the user.

10. A system for improving search results based on a search history, the system comprising:
a memory having computer readable instructions; and
a processor for executing the computer readable instructions, the computer readable instructions including:
monitoring searches performed by a user, the monitoring including collecting search data, the search data including search terms, search sites, and search times, each search time including a search initiation time and a search completion time, wherein at least one of the searches returns a first web page and a second web page as search results, and the user views both the first web page and the second web page subsequent to a search initiation time of the search and prior to a search completion time of the search;
categorizing the search data according to the search terms, the search sites, the search times, and result satisfactions to form the search history;
receiving a search request that includes one or more search terms related to at least one of the search terms in the search history;
estimating a predicted satisfaction level of the user with results of the received search request, the estimating based on contents of the received search request and the search history;
modifying the search request to increase the predicted satisfaction level of the user with results of the received search request, the modifying based on contents of the received search request and the search history;
performing a search based on the modified search request; and
outputting results of the search to the user, the results output in a priority order based at least in part on the search times and result satisfactions,
wherein a first search result related to a first satisfactory search result in the search history having a first search time is output as a higher priority result than a second search result related to a second satisfactory search result in the search history having a second search time lower than the first search time, and
wherein the first search result and the second search result are included in the results of the search.

11. The system of claim 10, wherein the modifying is performed automatically without input by the user.

12. The system of claim 10, wherein the modifying is performed based on user input.

13. The system of claim 10, wherein the categorizing the search data includes identifying search term failures and replacement search term successes, and the modifying includes substituting a replacement search term for a search term in the received search request.

14. The system of claim 13, wherein the computer readable instructions further include automatically performing the modifying based on a probability associated with the predicted satisfaction level of the user.

15. The system of claim 13, wherein the computer readable instructions further include automatically performing the modifying based on an incremental improvement associated with the predicted satisfaction level of the user.

16. The system of claim 10, wherein the computer readable instructions further include:
providing a user interface to the user; and
receiving information about the result satisfactions from the user via the user interface.

17. The system of claim 10, wherein the computer readable instructions further include:
storing the search history in a database;
accumulating search histories of other users in the database; and
utilizing the search histories of other users along with the search history of the user as input to the estimating and the modifying.

18. The system of claim 17, wherein the other users are in a social network of the user.

19. A computer program product for improving search results based on a search history, the computer program product comprising a non-transitory computer readable storage medium having program code embodied therewith, the program code executable by a processor for: monitoring searches performed by a user, the monitoring including collecting search data, the search data including search terms, search sites, and search times, each search time including a search initiation time and a search completion time, wherein at least one of the searches returns a first web page and a second web page as search results, and the user views both the first web page and the second web page subsequent to a search initiation time of the search and prior to a search completion time of the search; categorizing the search data according to the search terms, the search sites, the search times, and result satisfactions to form the search history; receiving a search request that includes one or more search terms related to at least one of the search terms in the search history; estimating a predicted satisfaction level of the user with results of the received search request, the estimating based on contents of the received search request and the search history; modifying the search request to increase the predicted satisfaction level of the user with results of the received search request, the modifying based on contents of the received search request and the search history; performing a search based on the modified search request; and outputting results of the search to the user, the results output in a priority order prioritized based at least in part on the search times and result satisfactions, wherein a first search result related to a first satisfactory search result in the search history having a first search time is output as a higher priority result than a second search result related to a second satisfactory search result in the search history having a second search time lower than the first search time, and wherein the first search result and the second search result are included in the results of the search.

20. The computer program product of claim 19, wherein the modifying is performed automatically without input by the user.

* * * * *